United States Patent

Enomoto et al.

[11] Patent Number: 5,930,052
[45] Date of Patent: Jul. 27, 1999

[54] ZOOM LENS SYSTEM

[75] Inventors: Takashi Enomoto, Chiba; Takayuki Ito, Saitama, both of Japan

[73] Assignee: Asahi Kogaku Kogyo Kabushiki Kaisha, Tokyo, Japan

[21] Appl. No.: 09/116,370

[22] Filed: Jul. 16, 1998

[30] Foreign Application Priority Data

Jul. 22, 1997 [JP] Japan .................................. 9-195850

[51] Int. Cl.$^6$ .................................................. G02B 15/14
[52] U.S. Cl. ........................... 359/692; 359/689; 359/717
[58] Field of Search ................................. 359/692, 689, 359/717

[56] References Cited

U.S. PATENT DOCUMENTS

| | | | |
|---|---|---|---|
| 4,818,081 | 4/1989 | Ito | 359/692 |
| 4,906,077 | 3/1990 | Ito | 359/692 |
| 4,936,661 | 6/1990 | Betensky et al. | 359/692 |
| 4,984,877 | 1/1991 | Ito | 359/692 |
| 5,162,947 | 11/1992 | Ito | 359/692 |
| 5,280,390 | 1/1994 | Ito | 359/692 |
| 5,309,285 | 5/1994 | Ito | 359/692 |
| 5,418,647 | 5/1995 | Ishisaka | 359/692 |
| 5,434,712 | 7/1995 | Ito | 359/692 |
| 5,530,589 | 6/1996 | Sato | 359/692 |
| 5,610,767 | 3/1997 | Ito | 359/692 |
| 5,666,233 | 9/1997 | Ogata | 359/692 |
| 5,687,028 | 11/1997 | Ito | 359/692 |
| 5,751,498 | 5/1998 | Ito | 359/692 |
| 5,777,800 | 7/1998 | Yamaguchi et al. | 359/692 |
| 5,808,812 | 9/1998 | Kamo | 359/692 |

Primary Examiner—Georgia Epps
Assistant Examiner—Evelyn A. Lester
Attorney, Agent, or Firm—Greenblum & Bernstein, P.L.C.

[57] ABSTRACT

A zoom lens system comprises a first lens group of positive power and a second lens group of negative power. The zoom lens system is arranged to perform a zooming operation by varying a distance between the first lens group and the second lens group. Furthermore, the first lens group comprises a front sub lens group of negative poser and a rear sub lens group of positive power. Still further, the front sub lens group comprises a first single lens element of negative power and a second single lens element having an aspherical surface on which the radius of curvature becomes larger in the off-axis region, and the rear sub lens group of the first lens group comprises a cemented lens having a positive lens element and a negative lens element. Moreover, the zoom lens system satisfies various conditions.

3 Claims, 9 Drawing Sheets

SPHERICAL
ABERRATION

SINE CONDITION

SPHERICAL
ABERRATION

CHROMATIC
ABERRATION

ASTIGMATISM

DISTORTION

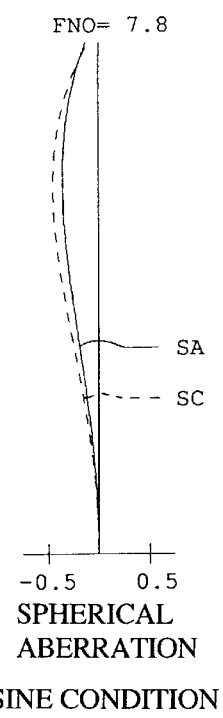
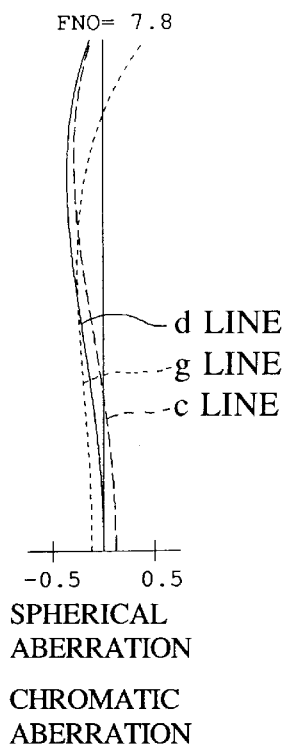
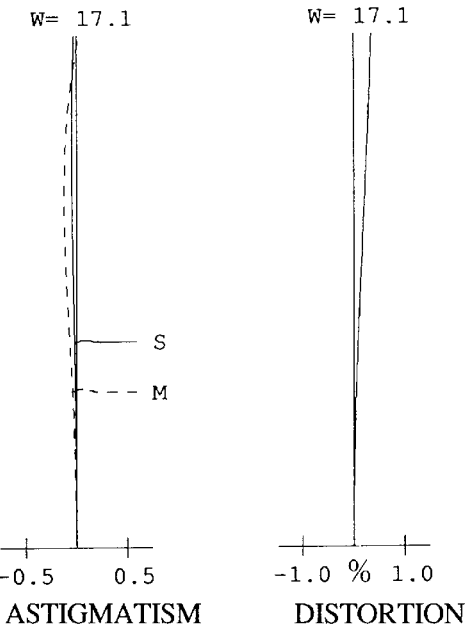
Fig.3A · Fig.3B · Fig.3C · Fig.3D
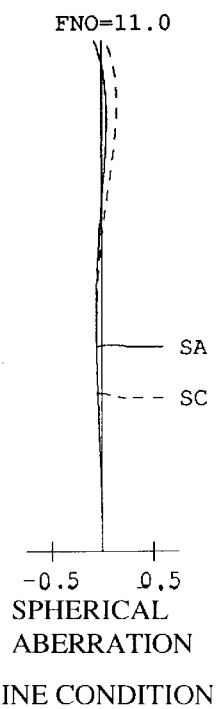
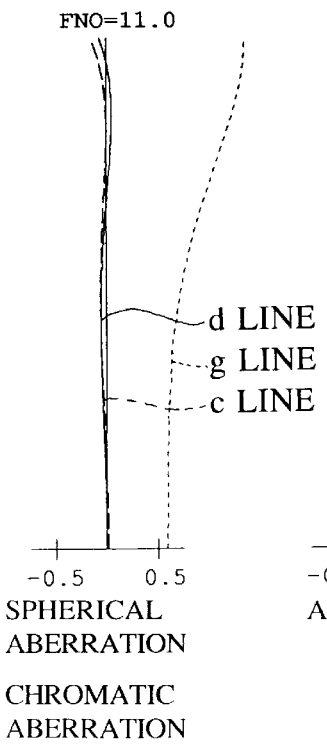
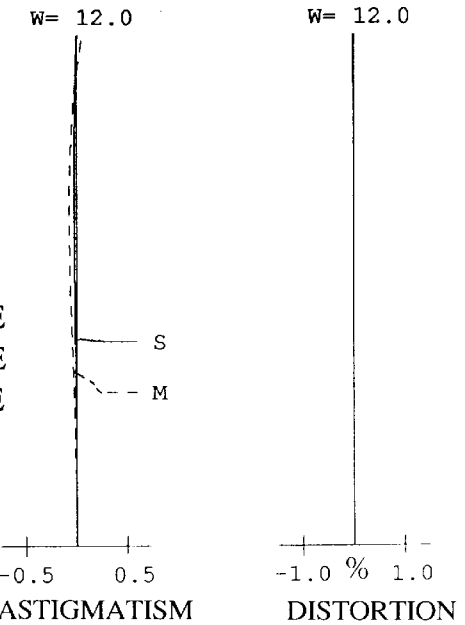
Fig.4A · Fig.4B · Fig.4C · Fig.4D

SPHERICAL
ABERRATION
SINE CONDITION

SPHERICAL
ABERRATION
CHROMATIC
ABERRATION

ASTIGMATISM

DISTORTION

FNO= 7.8

SA
SC

-0.5  0.5

SPHERICAL
ABERRATION

SINE CONDITION

FNO= 7.8 d LINE
g LINE
c LINE

-0.5  0.5

SPHERICAL
ABERRATION

CHROMATIC
ABERRATION

W= 17.1

S
M

-0.5  0.5

ASTIGMATISM

W= 17.1

-1.0 %  1.0

DISTORTION

FNO=11.0

SA
SC

-0.5  0.5

SPHERICAL
ABERRATION

SINE CONDITION

FNO=11.0 d LINE
g LINE
c LINE

-0.5  0.5

SPHERICAL
ABERRATION

CHROMATIC
ABERRATION

W= 12.0

S
M

-0.5  0.5

ASTIGMATISM

W= 12.0

-1.0 %  1.0

DISTORTION

SPHERICAL ABERRATION
SINE CONDITION

SPHERICAL ABERRATION
CHROMATIC ABERRATION

ASTIGMATISM

DISTORTION

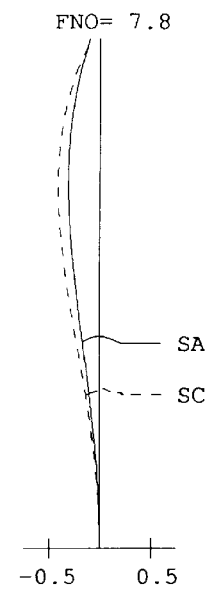
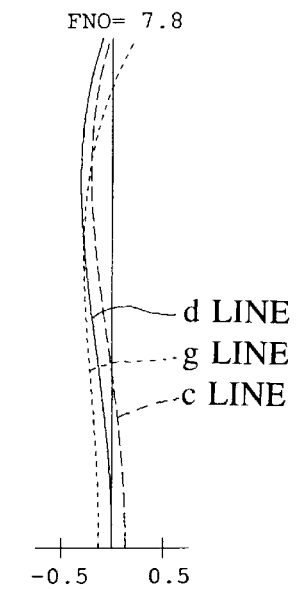
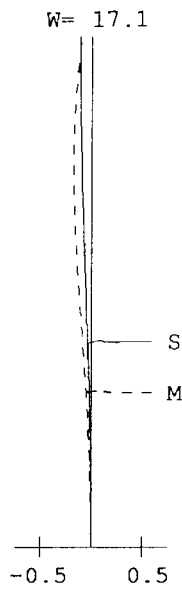
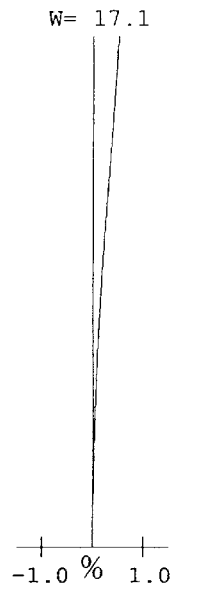
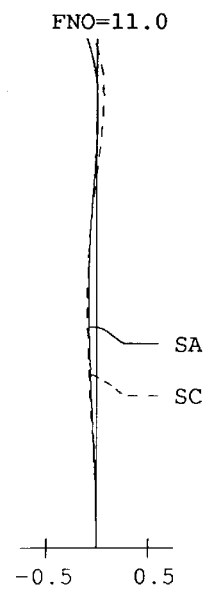
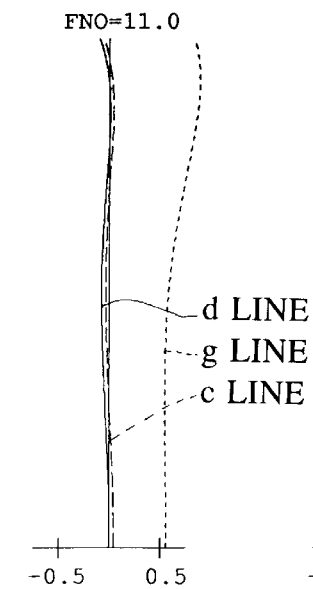
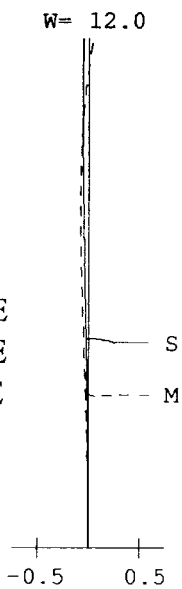
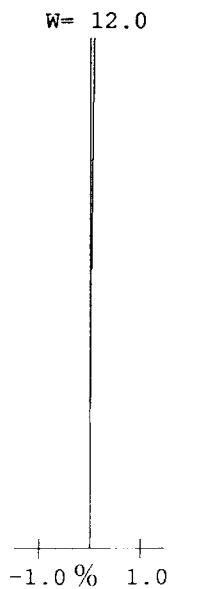

SPHERICAL ABERRATION
SINE CONDITION

SPHERICAL ABERRATION
CHROMATIC ABERRATION

ASTIGMATISM

DISTORTION

Fig.15A
FNO= 7.8
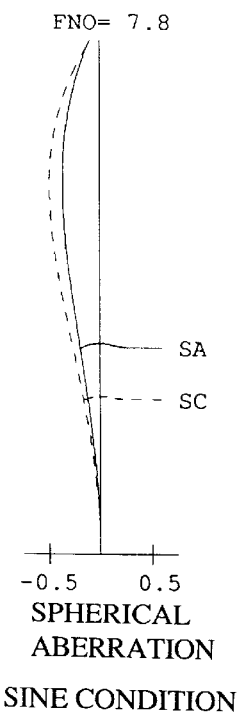
SA
SC
-0.5  0.5
SPHERICAL
ABERRATION
SINE CONDITION
Fig.15B
FNO= 7.8
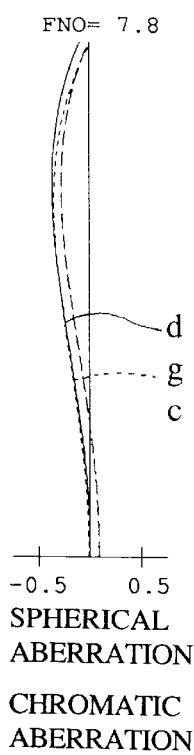
d LINE
g LINE
c LINE
-0.5  0.5
SPHERICAL
ABERRATION
CHROMATIC
ABERRATION
Fig.15c
W= 17.1
S
M
-0.5  0.5
ASTIGMATISM
Fig.15D
W= 17.1
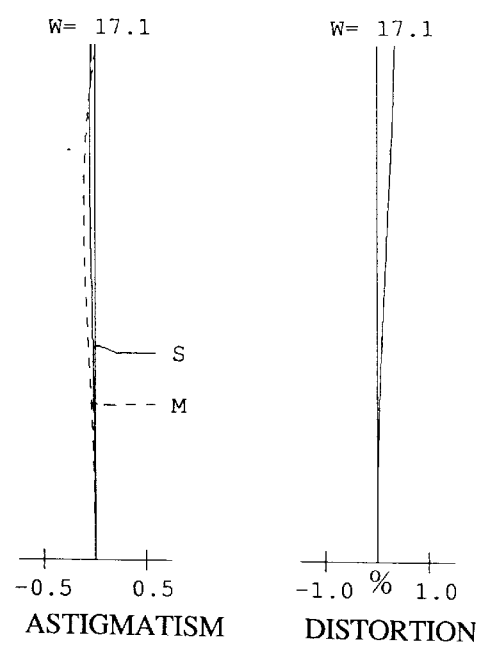
-1.0 % 1.0
DISTORTION
Fig.16A
FNO=11.0
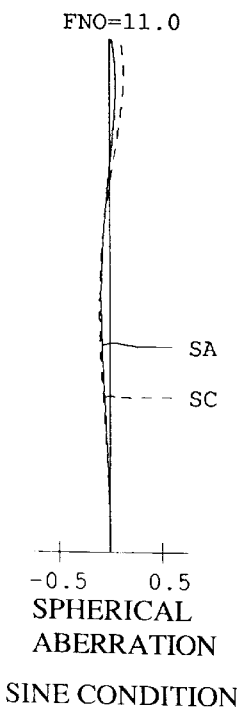
SA
SC
-0.5  0.5
SPHERICAL
ABERRATION
SINE CONDITION
Fig.16B
FNO=11.0
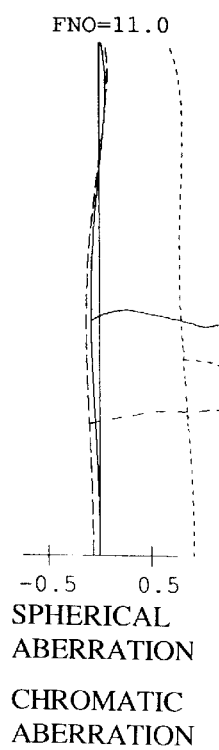
d LINE
g LINE
c LINE
-0.5  0.5
SPHERICAL
ABERRATION
CHROMATIC
ABERRATION
Fig.16c
W= 12.0
S
M
-0.5  0.5
ASTIGMATISM
Fig.16D
W= 12.0
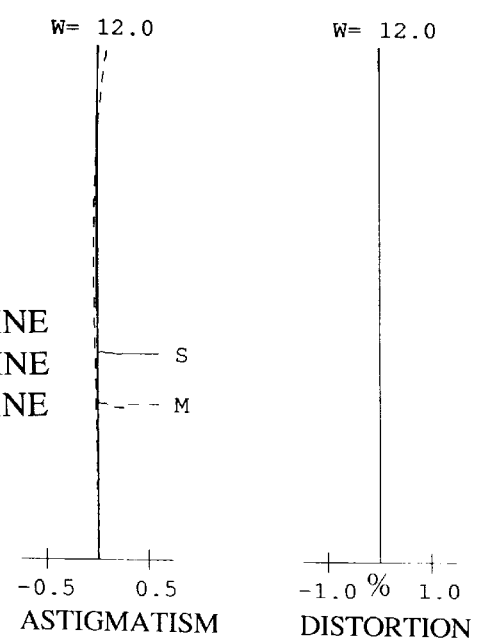
-1.0 % 1.0
DISTORTION

ZOOM LENS SYSTEM

BACKGROUND OF THE INVENTION

1. Field of the Invention

The present invention relates to a zoom lens for a compact camera having a shorter back focal length.

2. Description of the Related Art

There has been an increasing demand for higher magnification and miniaturization of zoom lenses for compact cameras in recent years. Zoom lenses employed in compact cameras differ to those of single lens reflex (SLR) cameras, because in the compact cameras a longer back focal length is not required. Therefore, as an example of possible optical system, the so-called two-lens-group optical system, which only includes a first lens group of positive power and a second lens group of negative power in that order from the object side, can be employed in compact cameras. Accordingly, a simple structure and miniaturization of the zoom lenses having a reduced number of lenses can be attained.

However, in the above-described two lens-group zoom lens and under the condition that the number of lens elements is 4 or 5, if a zoom ratio of 2.5 or more is required, chromatic aberration, the travelling distance of the lens groups and entire length of the lens system are inevitably increased.

SUMMARY OF THE INVENTION

The object of the present invention is to provide a zoom lens for a miniature compact camera which only employs a small number of lenses while providing a zoom ratio of 2.5 or more.

According to the present invention, there is provided a zoom lens system comprising a first lens group of positive power and a second lens group of negative power. The zoom lens system is arranged to perform a zooming operation by varying a distance between the first lens group and the second lens group. Furthermore, the first lens group comprises a front sub lens group of negative poser and a rear sub lens group of positive power. Still further, the front sub lens group comprises a first single lens element of negative power and a second single lens element having an aspherical surface on which the radius of curvature becomes larger in the off-axis region, and the rear sub lens group of the first lens group comprises a cemented lens having a positive lens element and a negative lens element. Moreover, the zoom lens system satisfies the following conditions:

$$3.5 < fT/f1G < 4.5 \quad (1)$$

$$r1/fW < 0 \quad (2)$$

$$0.5 < r4/fW < 1.2 \quad (3)$$

$$0.3 < fW/|fC| < 2 \, (fC<0, \, fC=rC/(n'-n)) \quad (4)$$

$$15 < \upsilon p - \upsilon N \quad (5);$$

wherein:

fT designates the focal length of the entire lens system at the long focal length extremity;

f1G designates the focal length of the first lens group;

ri designates the radius of curvature of the i-th surface from the object side;

fW designates the focal length of the entire lens system at the short focal length extremity;

rC designates the radius of curvature of the cemented surface of the cemented lens of the rear sub lens group in the first lens group;

n' designates the refractive index of the d-line for a lens material to form the lens element of the cemented lens, which is positioned at the object side with respect to a cemented surface;

n designates the refractive index of the d-line for a lens material to form the lens element, which is positioned at the image side with respect to a cemented surface;

υP designates the Abbe number for the positive lens element of the cemented lens of the first lens group;

υN designates the Abbe number for the negative lens element of the cemented lens of the first lens group.

Preferably, the zoom lens system according to the present invention satisfies the following condition:

$$-30 < \Delta IASP < -15; \quad (6)$$

wherein ΔIASP designates the amount of change of the spherical aberration coefficient of the second single lens element of the front sub lens group in the first lens group under the condition that the focal length of the entire lens system at the short focal-length extremity is converted to 1.0. Furthermore and preferably, the second lens group comprises two lens elements.

The present disclosure relates to subject matter contained in Japanese Patent Application No. 9-195850 (filed on Jul. 22, 1997) which is expressly incorporated herein by reference in its entirety.

BRIEF DESCRIPTION OF THE DRAWINGS

The invention will be discussed below in detail with reference to accompanying drawings, in which:

FIGS. 3A through 3D show aberration diagrams of the lens system in FIG. 1 at an intermediate focal length position;

FIGS. 4A through 4D show aberration diagrams of the lens system in FIG. 1 at the long focal length extremity;

FIGS. 11A through 11D show aberration diagrams of the lens system in FIG. 9 at an intermediate focal length position;

FIGS. 12A through 12D show aberration diagrams of the lens system in FIG. 9 at the long focal length extremity;

FIGS. 15A through 15D sow aberration diagrams of the lens system in FIG. 13 at an intermediate focal length position;

FIGS. 16A through 16D show aberration diagrams of the lens system in FIG. 13 at the long focal length extremity;

DESCRIPTION OF THE PREFERRED EMBODIMENT

Figure 17:
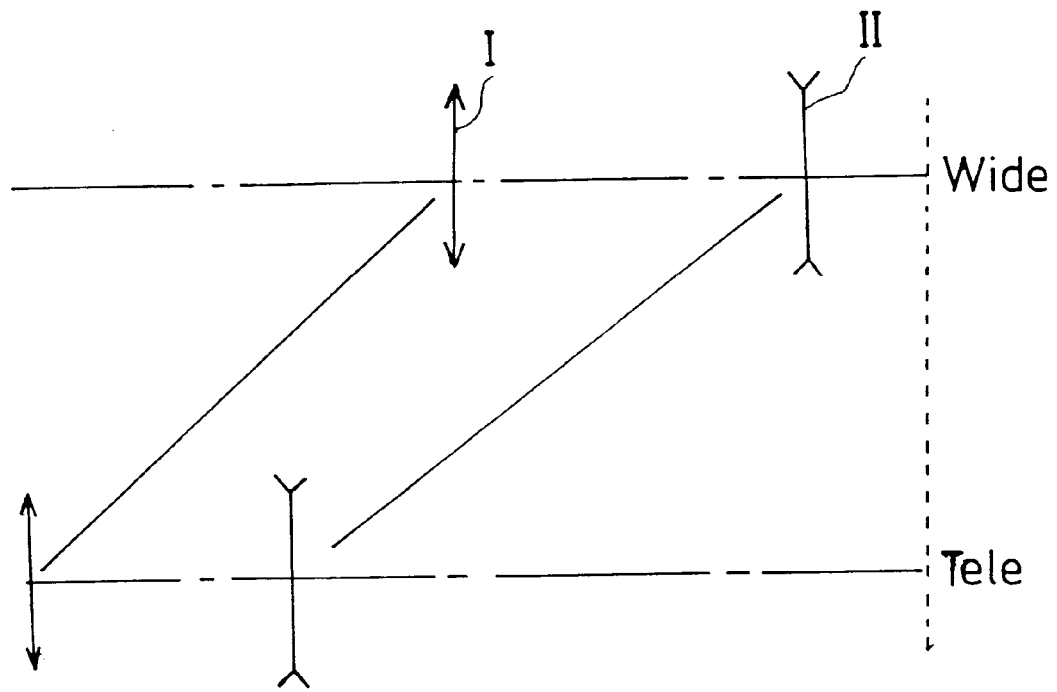
FIG. 17 is a diagram of the zooming path made by the zoom lens system according to the present invention.

The zoom lens system of the present invention has two lens groups, that is, a first lens group I of positive power and a second lens group II of negative power in this order from the object side. Zooming is performed by varying the distance between the two groups. The zooming path is shown in FIG. 17.

The first lens group I is composed of a negative front sub lens group I-1 and a positive rear sub lens group I-2. The negative front sub lens group I-1 of the first lens group I has, in order from the object side, a first single lens element L1 having negative power, and a second single lens element L2 with an aspherical surface having a larger radius of curvature in the off-axis region. The positive rear sub lens group I-2 of the first lens group I is composed of a cemented lens doublet having a positive lens element L3 and a negative lens element L4. Furthermore, due to the cemented lens of the rear sub lens group I-2 of the first lens group I, even if the power of the first lens group I is increased, chromatic aberration can still be corrected. Also, a cemented doublet type lens, such as the above explained lens elements L3 and L4, can more effectively minimize deterioration of optical performance due to errors occurred in the assembling process than an air-spaced doublet type lens can.

Condition (1) determines the power of the first lens group I. This is a condition to attain a shorter travelling distance of the first lens group I and second lens group II and miniaturization of the zoom lens while maintaining a zoom ratio of 2.5 or more.

If fT/f1G exceeds the upper limit, and under the condition that the number of lens elements in the zoom lens system is small, fluctuation of various aberrations according to variable—power cannot sufficiently be corrected.

If fT/f1G exceeds the lower limit, the traveling distance of the first and second lens groups (I and II) during zooming becomes large and miniaturization of the zoom lens cannot be attained. Furthermore, it becomes difficult to achieve a zoom ratio of 2.5 or more.

Condition (2) determines the radius of curvature of the first surface (the object side surface) of the first lens element L1. When the first surface of the first lens element L1 is formed as a divergent surface so that condition (2) is satisfied, the reduction in the diameter of the first lens element L1 and miniaturization of the zoom lens can be attained while illumination is sufficiently obtained on the peripheral area of the image.

If r1/fW exceeds the upper limit, the first surface does not become a divergent surface, and the front lens diameter has to be increased in order to obtain sufficient amount of peripheral illumination.

Condition (3) determines the radius of curvature of the fourth surface (the image side surface of the second lens element L2). When the fourth surface is formed as a divergent surface so that condition (3) is satisfied, spherical aberration can be corrected from the short focal length side to the long focal length side.

If r4/fW exceeds the upper limit, the effect of divergence becomes very small. Therefore, even when an attempt is made to correct spherical aberration, as an amount of asphericity of the second lens element L2 is greatly increased, aberration due to eccentricity of the second lens element becomes excessive.

If r4/fW exceeds the lower limit, as the radius of curvature of the fourth surface decreases, axial coma is influenced by an amount of eccentricity of the second lens element L2. In other words, as the radius of curvature of the fourth surface becomes small, even if the same eccentricity is given, axial coma inevitably becomes larger. Still further, it is said that a large amount of axial coma occurs even due to a slight amount of eccentricity of the second lens element L2.

Condition (4) determines the radius of curvature of the cemented surface of the cemented lens in the first lens group I. If a predetermined amount of divergence is given to the cemented surface so that condition (4) is satisfied, spherical aberration and coma can well be corrected.

If fW/|fC| exceeds the upper limit, as the amount of divergence becomes excessive, an over-correction of the spherical aberration occurs, and high-order aberration occurs.

If fW/|fC| exceeds the lower limit, the effect of divergence is very little, and spherical aberration cannot effectively be corrected.

Condition (5) determines the Abbe number for the positive and negative lens elements (L3 and L4) of the cemented lens in the first lens group I. If materials of the positive and negative lens elements (L3 and L4) are selected so that condition (5) is satisfied, axial chromatic aberration at a long focal length side can well be corrected.

If $\upsilon p-\upsilon N$ exceeds the lower limit and the difference of the Abbe number for the positive and negative lens elements (L3 and L4) is small, it becomes difficult to correct chromatic aberration from the short focal length side to the long focal-length side.

Condition (6) determines the amount of asphericity of the second single lens element L2. If this condition is satisfied, spherical aberration can be curbed.

If ΔIASP exceeds the upper limit, correction of spherical aberration by the aspherical surface (asphericity) is not effective.

If ΔIASP exceeds the lower limit, the amount of asphericity increases, which also increases the difficulties in manufacturing the lenses.

The relation between aspherical surface coefficient and aberration coefficient will be described. The aspherical surface is generally defined as follows:

$$x=cy^2/\{1+[1-(1+K)c^2y^2]^{1/2}\}+A4y^4+A6y^6+A8y^8+A10y^{10}+\ldots$$

wherein, y designates a distance from the optical axis;

x designates a distance from a tangent plane of an aspherical vertex;

c designates a curvature of the aspherical vertex (1/r);

K designates a conic constant;

A4 designates a fourth-order aspherical coefficient;

A6 designates a sixth-order aspherical coefficient;

A8 designates a eighth-order aspherical coefficient; and

A10 designates a tenth-order aspherical coefficient;

In this equation, to obtain the aberration coefficient, the following substitution is done to replace K with "0" (Bi=Ai when K=0).

$$B4 = A4 + Kc^3/8$$

$$B6 = A6 + (K2+2K)c^5/16$$

$$B8 = A8 + 5(K3+3K2+3K)c^7/128$$

$$B10 = A10 + 7(K4+4K3+6K2+4K)c^9/256$$

Then, the following equation is obtained.

$$x = cy^2/\{1+[1-(1-c^2y^2)^{1/2}]\} + B4y^4 + B6y^6 + B8y^8 + B10y^{10} + \ldots$$

When the focal length f is normalized to be 1.0, the resultant value is transformed as follows. Namely, substitute the following equations into the above equation:

$$X = x/f, \ Y = y/f, \ C = fc$$

$$\alpha 4 = f^3 B4, \ \alpha 6 = f^5 B6, \ \alpha 8 = f^7 B8, \ \alpha 10 = f^9 B10$$

In this way, he following equation is obtained.

$$x = cy^2/\{1+[1-c^2y^2]^{1/2}\} + \alpha 4 y^4 + \alpha 6 y^6 + \alpha 8 y^8 + \alpha 10 y^{10} + \ldots$$

The second and subsequent terms define the amount of asphericity of the aspherical surface.

Then, the third order aberration contributions due to the fourth order aspherical coefficient $\alpha 4$ are obtained as follows:

$$\Delta I = h4\Phi$$

$$\Delta II = h3k\Phi$$

$$\Delta III = h2k2\Phi$$

$$\Delta IV = h2k2\Phi$$

$$\Delta V = hk3\Phi$$

Wherein,

I designates the spherical aberration coefficient,

II designates the comatic coefficient,

III designates the astigmatism coefficient,

IV designates the sagittal field of curvature coefficient,

V designates the distortion coefficient, h designates the height at which a paraxial axial ray is made incident on the aspherical surface; and k designates the height at which a paraxial off-axis ray (from the off axis object point) through the center of the entrance pupil is made incident on the aspherical surface; and $$\Phi = 8(N'-N)\alpha 4$$

wherein N designates the refractive index of a substance on the object side of the aspherical surface, and N' designates the refractive index of a substance on the image side of the aspherical surface.

The present invention will be explained through the following embodiments. In all of the embodiments 1 through 4, in order from the object side, a positive first lens group I, a diaphragm S, and a negative second lens group II are provided. The first lens group I is composed of a front negative sub lens group I-1 and a rear positive sub lens group I-2. The negative front sub lens group I-1 is composed of, in order from the object side, a first single lens element L1 having negative power and a second single lens element L2 having an aspherical surface on the object side. On the aspherical surface of the second single lens element L2, a radius of curvature is made larger in an off-axis region. The rear sub lens group I-2 is composed of a cemented lens having a positive lens element L3 and a negative lens element L4 in this order from the object side. Zooming is performed by the varying the distance between the first lens group I and the second lens group II. The second lens group II is composed of, in order from the object side, a positive meniscus lens element L5 convex to the image side, and a negative meniscus lens element L6 convex to the image side. Furthermore, the positive meniscus lens element L5 has an aspherical surface on the object side.

The First Embodiment

Figure 1:
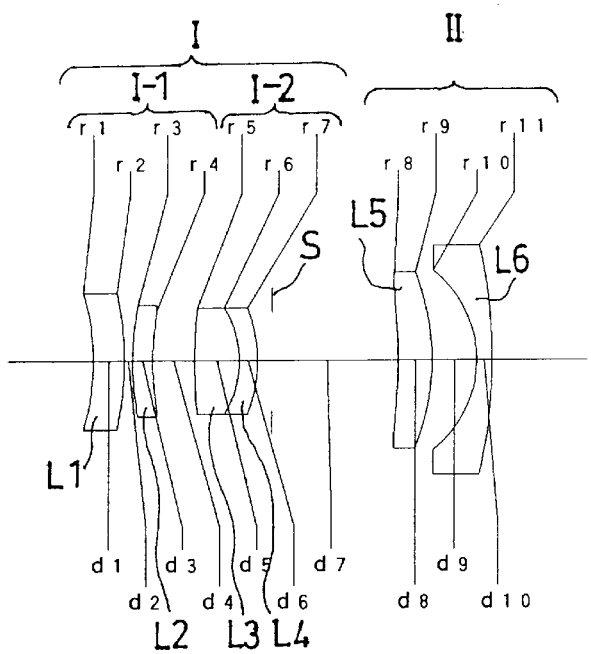
FIG. 1 is a schematic view showing the first embodiment of a zoom lens system according to the present invention.
Figure 2A:
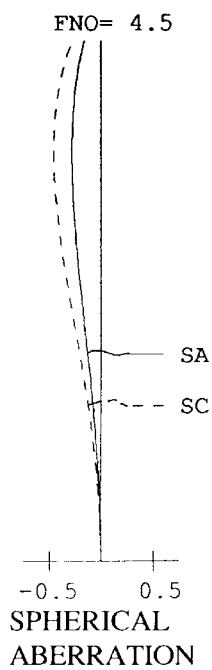
FIGS. 2A through 2D show aberration diagrams of the lens system in FIG. 1 at the short focal length extremity.
Figure 2B:
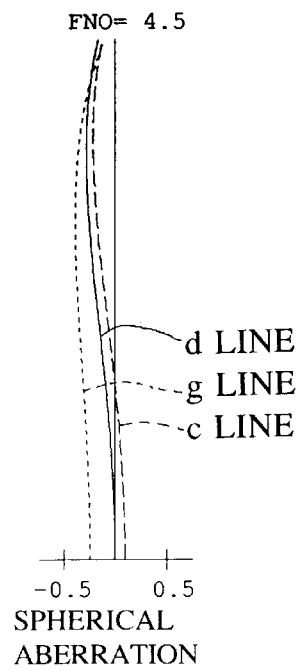
Figure 2C:
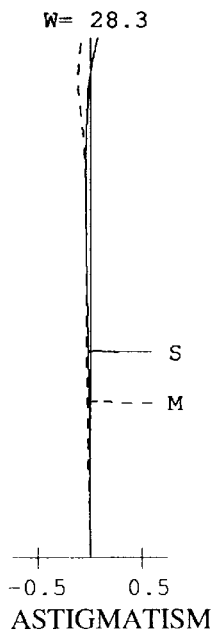
Figure 2D:
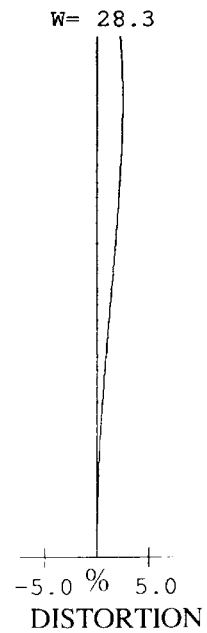

With regard to the first embodiment, the entire optical system is shown in FIG. 1, the numerical data are shown in Table 1, the aberration diagrams at the short focal length extremity are shown in FIGS. 2A through 2D, the aberration diagrams at an intermediate focal length position are shown in FIGS. 3A through 3D, and the aberration diagrams at the long focal length extremity are shown in FIGS. 4A through 4D. In the aberration diagrams, SA designates spherical aberration; SC designates the sine condition; the d, g and c lines designate the chromatic aberration represented by spherical aberration at the respective wave length; S designates the sagittal image; and M designates the meridional image. In the diagrams and Tables, FNO designates the F-number, f designates the focal length, W designates the half angle of view, fB designates the back focal length, ri designates the radius of curvature of each (i-th) lens surface, di designates each (i-th) lens element thickness or distance, N designates the refractive index of the d-line, and $\upsilon$ designates the Abbe number with respect to the d-line.

TABLE 1

FNO = 1 : 4.5–7.8–11.0
f = 39.00–70.00–102.00 (zoom ratio = 2.62)
W = 28.3–17.1–12.0
fB = 9.93–38.37–67.73

| Surface No. | r | d | N | ν |
|---|---|---|---|---|
| 1 | −21.050 | 2.80 | 1.69895 | 30.1 |
| 2 | −28.360 | 0.73 | — | — |
| 3 | 24.461 | 1.80 | 1.58547 | 29.9 |
| 4 | 24.801 | 3.81 | — | — |
| 5 | 48.539 | 4.00 | 1.48749 | 70.2 |
| 6 | −8.960 | 1.60 | 1.60342 | 38.0 |
| 7 | −13.250 | 1.30 | — | — |
| Diaphragm | ∞ | 11.41–4.57–1.87 | — | — |
| 8* | −42.906 | 3.03 | 1.58547 | 29.9 |
| 9 | −21.366 | 4.06 | — | — |
| 10 | −10.075 | 1.40 | 1.77250 | 49.6 |
| 11 | −45.694 | — | — | — |

*indicates the aspherical surface which is symmetrical with respect to the optical axis.
Aspherical Surface Data:
No.3: K = 0.00, A4 = −0.64300 × 10 − 4, A6 = 0.58700 × 10 − 6, A8 = 0.00, A10 = 0.00, A12 = 0.00.
No.8: K = 0.00, A4 = 0.61000 × 10 − 4, A6 = 0.39800 × 10 − 6, A8 = 0.31800 × 10 − 8, A10 = 0.00, A12 = 0.00.

The Second Embodiment

Figure 5:
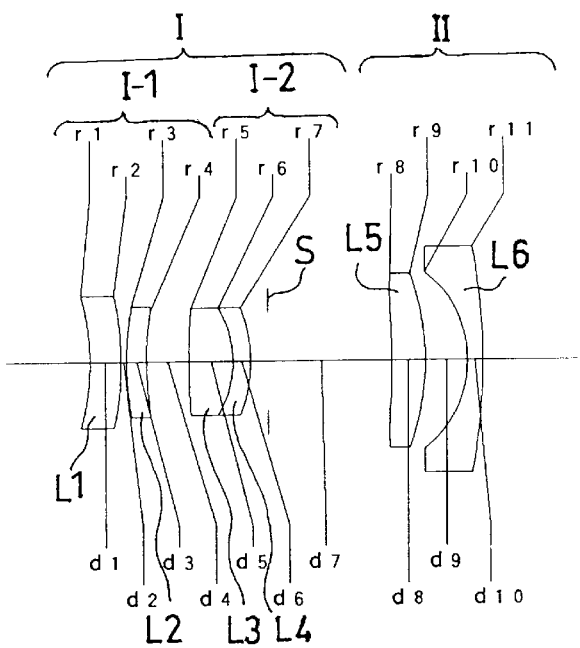
FIG. 5 is a schematic view showing the second embodiment of the zoom lens system according to the present invention.
Figure 6A:
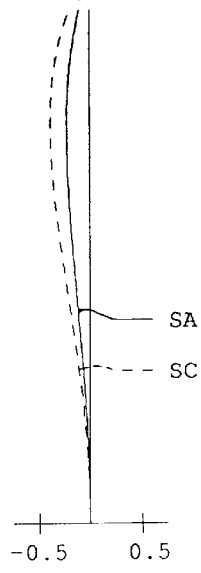
FIGS. 6A through 6D show aberration diagrams of the lens system in FIG. 5 at the short focal length extremity.
Figure 6B:
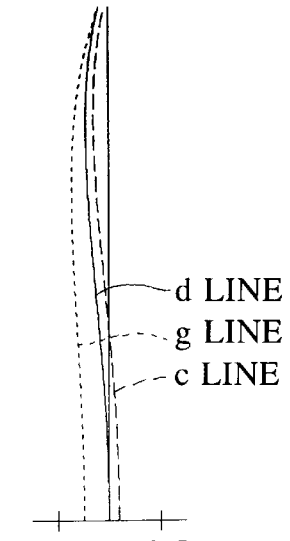
Figure 6C:
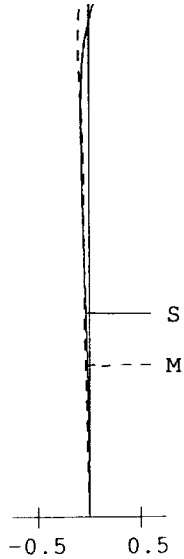
Figure 6D:
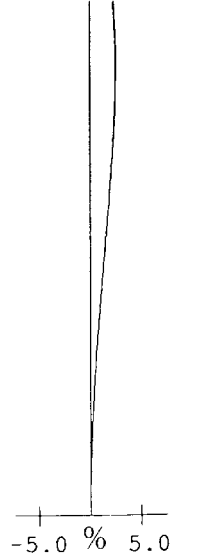
Figure 7A:
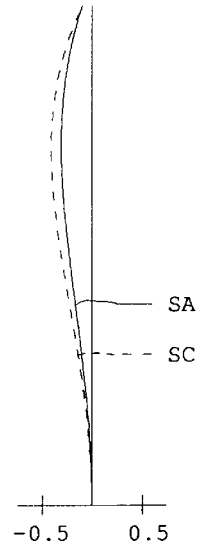
FIGS. 7A through 7D show aberration diagrams of the lens system in FIG. 5 at an intermediate focal length position.
Figure 7B:
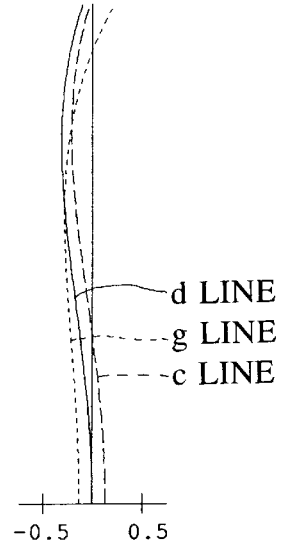
Figure 7C:
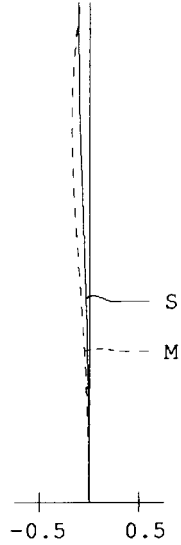
Figure 7D:
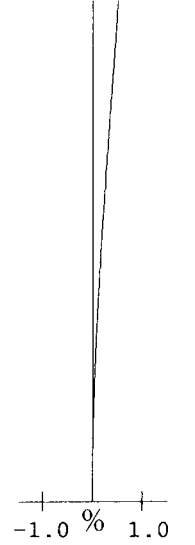
Figure 8A:
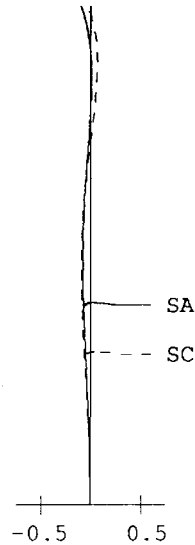
FIGS. 8A through 8D show aberration diagrams of the lens system in FIG. 5 at the long focal length extremity.
Figure 8B:
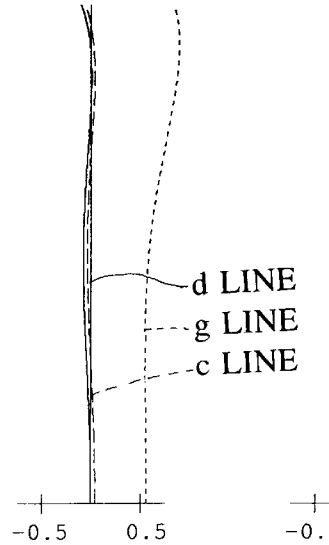
Figure 8C:
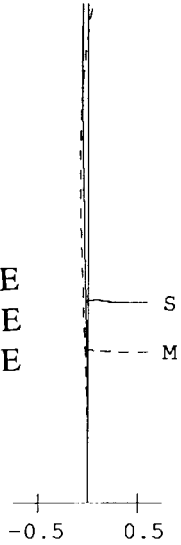
Figure 8D:
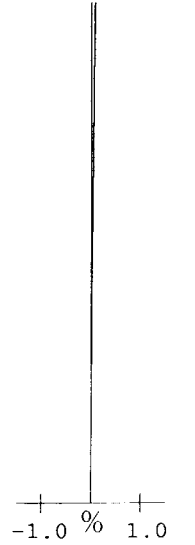

With regard to the second embodiment, the entire optical system is shown in FIG. 5, the numerical data are shown in Table 2, the aberration diagrams at the short focal length extremity are shown in FIGS. 6A through 6D, the aberration diagrams at an intermediate focal length position are shown in FIGS. 7A through 7D, and the aberration diagrams at the long focal length extremity are shown in FIGS. 8A through 8D.

TABLE 2

FNO = 1 : 4.5–7.8–11.0
f = 39.33–70.00–101.50 (zoom ratio = 2.58)
W = 28.3–17.1–12.0
fB = 10.38–38.27–66.92

| Surface No. | r | d | N | ν |
|---|---|---|---|---|
| 1 | −21.071 | 2.80 | 1.80518 | 25.4 |
| 2 | −27.681 | 0.50 | — | — |
| 3* | 25.924 | 1.80 | 1.58547 | 29.9 |
| 4 | 29.819 | 3.87 | — | — |
| 5 | 62.795 | 4.00 | 1.51255 | 67.6 |
| 6 | −9.244 | 1.60 | 1.82500 | 34.5 |
| 7 | −12.731 | 1.60 | — | — |
| Diaphragm | ∞ | 11.24–4.56–1.90 | — | — |
| 8* | −58.173 | 3.03 | 1.58547 | 29.9 |
| 9 | −22.582 | 3.85 | — | — |
| 10 | −10.047 | 1.40 | 1.77256 | 47.9 |
| 11 | −53.891 | — | — | — |

*indicates the aspherical surface which is symmetrical with respect to the optical axis.
Aspherical surface data:
No.3: $K = 0.00, A4 = -0.61049 \times 10-4, A6 = -0.53382 \times 10-6, A8 = 0.00, A10 = 0.00, A12 = 0.00$.
No.8: $K = 0.00, A4 = 0.66587 \times 10-4, A6 = 0.38342 \times 10-6, A8 = 0.32138 \times 10-8, A10 = 0.00, A12 = 0.00$.

The Third Embodiment

Figure 9:
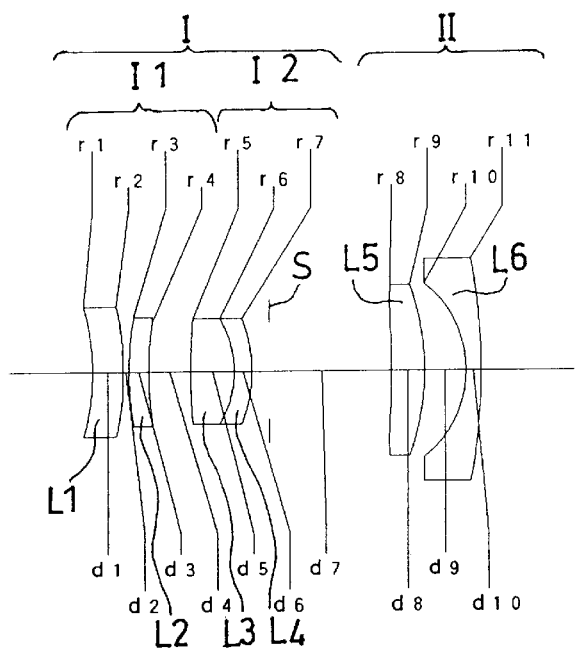
FIG. 9 is a schematic view showing the third embodiment of the zoom lens system according to the present invention.
Figure 10A:
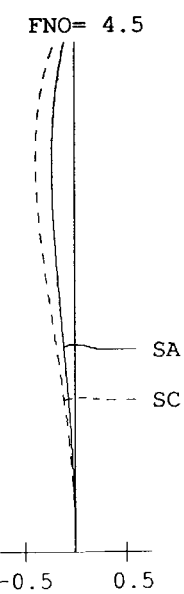
FIGS. 10A through 10D show aberration diagrams of the lens system in FIG. 9 at the short focal length extremity.
Figure 10B:
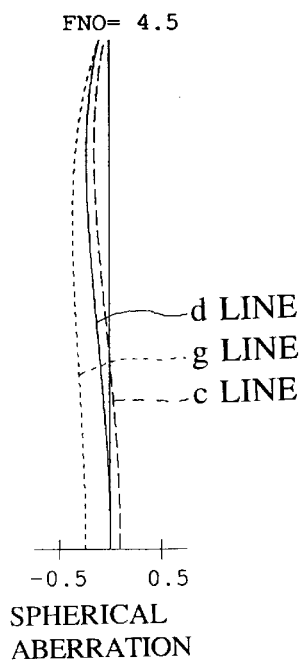
Figure 10C:
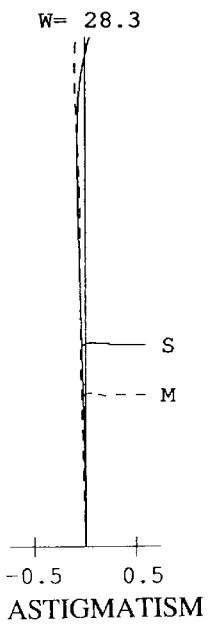
Figure 10D:
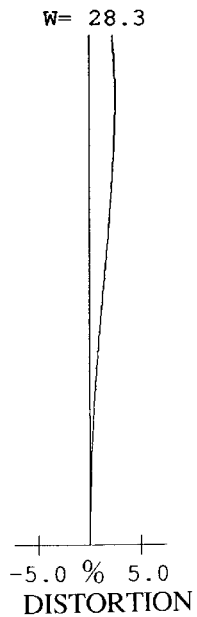

With regard to the third embodiment, the entire optical system is shown in FIG. 9, the numerical data are shown in Table 3, the aberration diagrams at the short focal length extremity are shown in FIGS. 10A through 10D, the aberration diagrams at an intermediate focal length position are shown in FIGS. 11A through 11D, and the aberration diagrams at the long focal length extremity are shown in FIGS. 12A through 12D.

TABLE 3

FNO = 1 : 4.5–7.8–11.0
f = 39.33–70.00–101.50 (zoom ratio 2.58)
W = 28.2–17.1–12.0
fB = 10.44–38.20–66.72

| Surface No. | r | d | N | ν |
|---|---|---|---|---|
| 1 | −20.389 | 2.80 | 1.69895 | 30.1 |
| 2 | −27.220 | 0.50 | — | — |
| 3* | 24.744 | 1.80 | 1.58547 | 29.9 |
| 4 | 23.000 | 4.03 | — | — |
| 5 | 43.368 | 4.00 | 1.48749 | 70.2 |
| 6 | −8.994 | 1.60 | 1.59551 | 39.2 |
| 7 | −13.211 | 1.30 | — | — |
| Diaphragm | ∞ | 11.10–4.52–1.90 | — | — |
| 8* | −58.777 | 3.03 | 1.58547 | 29.9 |
| 9 | −24.157 | 4.17 | — | — |
| 10 | −10.401 | 1.40 | 1.77250 | 49.6 |
| 11 | −58.929 | — | — | — |

*indicates the aspherical surface which is symmetrical with respect to the optical axis.
Aspherical surface data:
No.3: $K = 0.00, A4 = -0.68547 \times 10-4, A6 = -0.57644 \times 10-6, A8 = 0.00, A10 = 0.00, A12 = 0.00$.
No.8: $K = 0.00, A4 = 0.57328 \times 10-4, A6 = 0.31314 \times 10-6, A8 = 0.24328 \times 10-8, A10 = 0.00, A12 = 0.00$.

The Fourth Embodiment

Figure 13:
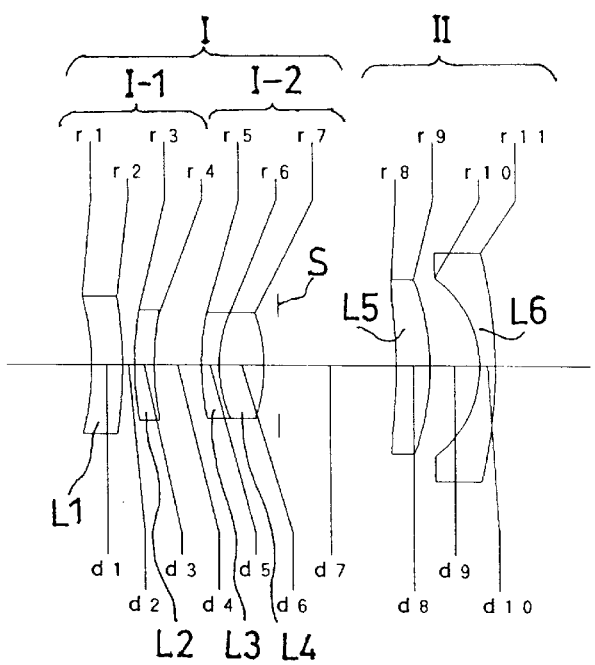
FIG. 13 is a schematic view showing the forth embodiment of the zoom lens system according to the present invention.
Figure 14A:
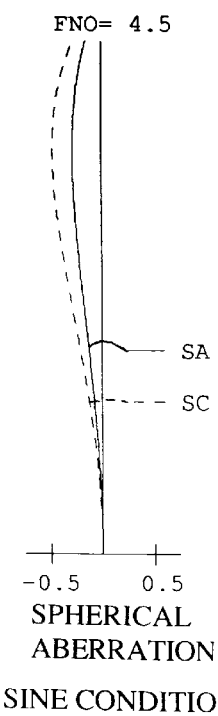
FIGS. 14A through 14D shows aberration diagrams of the lens system in FIG. 13 at the short focal length extremity.
Figure 14B:
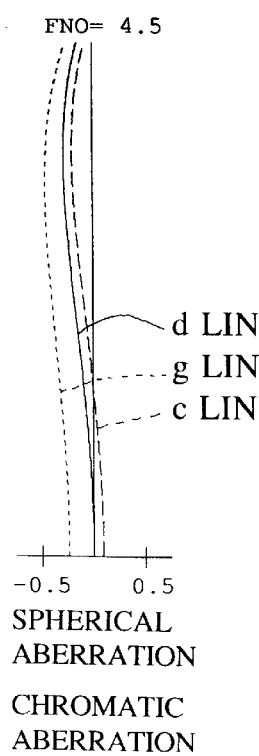
Figure 14C:
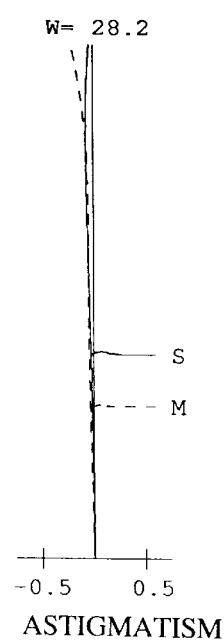
Figure 14D:
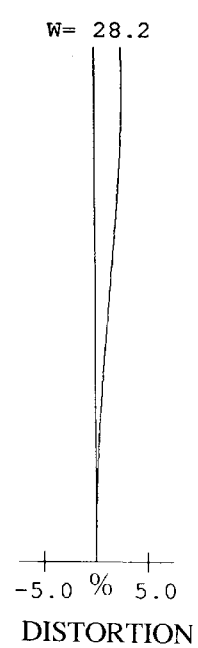

With regard to the fourth embodiment, the entire optical system is shown in FIG. 13, the numerical data are shown in Table 4, the aberration diagrams at the short focal length extremity are shown in FIGS. 14A through 14D, the aberration diagrams at an intermediate focal length position are shown in FIGS. 15A through 15D, and the aberration diagrams at the long focal length extremity are shown in FIGS. 16A through 16D.

TABLE 4

FNO = 1 : 4.5–7.8–11.0
f = 39.33–70.00–101.50 (zoom ratio = 2.58)
W = 28.2–17.1–12.0
fB = 10.08–37.36–65.37

| Surface No. | r | d | N | ν |
|---|---|---|---|---|
| 1 | −23.763 | 2.80 | 1.69895 | 30.1 |
| 2 | −40.426 | 1.06 | — | — |
| 3* | 25.446 | 1.80 | 1.58547 | 29.9 |
| 4 | 25.121 | 4.26 | — | — |
| 5 | 23.056 | 1.60 | 1.65000 | 59.3 |
| 6 | 12.018 | 4.00 | 1.48985 | 77.1 |
| 7 | −15.035 | 1.30 | — | — |
| Diaphragm | ∞ | 10.64–4.39–1.90 | — | — |
| 8* | −39.528 | 3.03 | 1.58547 | 29.9 |
| 9 | −22.588 | 4.53 | — | — |
| 10 | −9.989 | 1.40 | 1.77250 | 49.6 |
| 11 | −42.151 | — | — | — |

*indicates the aspherical surface which is symmetrical with respect to the optical axis.
Aspherical surface data:
No.3: $K = 0.00, A4 = -0.64300 \times 10-4, A6 = -0.58700 \times 10-6, A8 = 0.00, A10 = 0.00, A12 = 0.00$.
No.8: $K = 0.00, A4 = 0.61000 \times 10-4, A6 = 0.39800 \times 10-6, A8 = 0.31800 \times 10-8, A10 = 0.00, A12 = 0.00$.

Table 5 shows the values of each condition for the first to fourth embodiments.

TABLE 5

| | Emb. (1) | Emb. (2) | Emb. (3) | Emb. (4) |
|---|---|---|---|---|
| Condition(1) | 3.98 | 3.95 | 3.98 | 4.04 |
| Condition(2) | −0.54 | −0.54 | −0.52 | −0.61 |
| Condition(3) | 0.63 | 0.76 | 0.59 | 0.64 |
| Condition(4) | 0.51 | 1.33 | 0.47 | 0.52 |
| Condition(5) | 32.2 | 33.1 | 31.0 | 17.8 |
| Condition(6) | −23.1 | −22.2 | −24.7 | −23.2 |

As can be clearly seen from Table 5, the embodiments 1 through 4 satisfy all of the conditions 1 through 6. Furthermore, the aberration diagrams show that aberration is well corrected.

According to the present invention, a miniature zoom lens system which can attain a high zoom ratio of 2.5 or more and employs only a small number of lens elements, can be provided.

What is claimed is:

1. A zoom lens system comprising a first lens group of positive power and a second lens group of negative power, said zoom lens system being arranged to perform a zooming operation by varying a distance between said first lens group and said second lens group, wherein said first lens group comprises a front sub lens group of negative power and a rear sub lens group of positive power;

wherein said front sub lens group comprises a first single lens element having negative power and a second single lens element, said second single lens element having an aspherical surface on which a radius of curvature become larger in the off-axis region;

wherein said rear sub lens group of said first lens group comprises a cemented lens having a positive lens element and a negative lens element; and wherein said zoom lens system satisfies the following conditions:

$3.5 < fT/f1G < 4.5$ $r1/fW < 0$ $0.5 < r4/fW < 1.2$ $0.3 < fW/|fC| < 2 \; (fC < 0, fC = rC/(n'-n))$ $15 < \upsilon p - \upsilon N;$ wherein:

fT designates the focal length of the entire lens system at the long focal length extremity;

f1G designates the focal length of the first lens group;

ri designates the radius of curvature of the i-th surface from the object side;

fW designates the focal length of the entire lens system at the short focal length extremity;

rC designates the radius of curvature of the cemented surface of said cemented lens of said rear sub lens group in said first lens group;

n' designates the refractive index of the d-line for a lens material to form said lens element of said cemented lens, which is positioned at the object side with respect to a cemented surface;

n designates the refractive index of the d-line for a lens material to form said lens element, which is positioned at the image side with respect to a cemented surface;

υP designates the Abbe number for said positive lens element of said cemented lens of said first lens group;

υN designates the Abbe number for said negative lens element of said cemented lens of said first lens group.

2. The zoom lens system according to claim 1, wherein said zoom lens system further satisfies the following condition:

$-30 < \Delta IASP < -15;$ wherein ΔIASP designates the amount of change of the spherical aberration coefficient of said second single lens element of said front sub lens group in said first lens group under the condition that the focal length of the entire lens system at the short focal length extremity is converted to 1.0.

3. The zoom lens system according to claim 1, wherein said second lens group comprises two lens elements.

* * * * *